US011362897B2

(12) United States Patent
Schirmer et al.

(10) Patent No.: US 11,362,897 B2
(45) Date of Patent: Jun. 14, 2022

(54) SITE POLICY ADMINISTRATIVE AGENT

(75) Inventors: Andrew L. Schirmer, Andover, MA (US); Ruthie D. Lyle, Durham, NC (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 2192 days.

(21) Appl. No.: 11/132,906

(22) Filed: May 19, 2005

(65) Prior Publication Data
US 2006/0262740 A1    Nov. 23, 2006

(51) Int. Cl.
| | |
|---|---|
| G06Q 30/06 | (2012.01) |
| H04L 41/0893 | (2022.01) |
| G06Q 30/02 | (2012.01) |
| H04L 41/046 | (2022.01) |

(52) U.S. Cl.
CPC ......... *H04L 41/0893* (2013.01); *G06Q 30/02* (2013.01); *G06Q 30/06* (2013.01); *H04L 41/046* (2013.01)

(58) Field of Classification Search
USPC .............. 705/51–69; 725/9, 10, 27, 28; 709/223–229
See application file for complete search history.

(56) References Cited

U.S. PATENT DOCUMENTS

| | | | | |
|---|---|---|---|---|
| 5,740,549 | A * | 4/1998 | Reilly et al. ............... | 705/14.42 |
| 5,892,900 | A * | 4/1999 | Ginter ..................... | G06F 21/10 726/26 |
| 5,970,470 | A * | 10/1999 | Walker et al. .................. | 705/14 |
| 6,073,242 | A * | 6/2000 | Hardy et al. ...................... | 726/1 |
| 6,141,653 | A * | 10/2000 | Conklin et al. ................. | 705/80 |
| 6,141,754 | A * | 10/2000 | Choy ............................... | 726/1 |
| 6,226,618 | B1 * | 5/2001 | Downs et al. .................... | 705/1 |

(Continued)

FOREIGN PATENT DOCUMENTS

| | | | | |
|---|---|---|---|---|
| EP | 1577816 A2 | * | 9/2005 | ............ G06F 21/00 |
| JP | 2003271635 A | * | 9/2003 | |

OTHER PUBLICATIONS

R. H. Koenen, J. Lacy, M. Mackay and S. Mitchell, "The long march to interoperable digital rights management," in Proceedings of the IEEE, vol. 92, No. 6, pp. 883-897, Jun. 2004, doi: 10.1109/JPROC.2004.827357. https://ieeexplore.ieee.org/stamp/stamp.jsp?tp=&arnumber=1299164 (Year: 2004).*

(Continued)

*Primary Examiner* — El Mehdi Oussir
(74) *Attorney, Agent, or Firm* — Jorge R. Maranto

(57) ABSTRACT

A method, system and apparatus for inter-parties network computing. A policy management method can include establishing a set of policy terms for receiving content from a content provider based upon preferences selected by a content recipient externally to the content recipient and content provider. The method further can include enforcing the policy terms externally to the content recipient and content provider for content provided by the content provider for receipt by the content recipient. Notably, the establishing step can include mapping the selected preferences to the set of policy terms. The establishing step also can include exposing an interface to the content recipient, and accepting the selected preferences through the interface.

5 Claims, 2 Drawing Sheets

(56) References Cited

U.S. PATENT DOCUMENTS

| | | | |
|---|---|---|---|
| 6,233,618 B1* | 5/2001 | Shannon | G06F 17/30887 707/999.01 |
| 6,332,135 B1* | 12/2001 | Conklin et al. | 705/80 |
| 6,408,336 B1* | 6/2002 | Schneider et al. | 709/229 |
| 6,587,668 B1* | 7/2003 | Miller et al. | 434/350 |
| 6,658,568 B1 | 12/2003 | Ginter et al. | |
| 6,731,393 B1* | 5/2004 | Currans | G06F 3/1204 358/1.12 |
| 7,043,555 B1* | 5/2006 | McClain et al. | 709/229 |
| 7,089,309 B2* | 8/2006 | Ramaley et al. | 709/226 |
| 7,165,174 B1* | 1/2007 | Ginter | H04L 9/3263 713/153 |
| 7,249,164 B1* | 7/2007 | Littlefield | 709/216 |
| 7,376,628 B2* | 5/2008 | Johnson | 705/67 |
| 7,383,233 B1* | 6/2008 | Singh et al. | 705/80 |
| 7,437,772 B1* | 10/2008 | Thenthiruperai et al. | 726/30 |
| 7,751,912 B2* | 7/2010 | Hirai | 700/94 |
| 8,522,306 B2* | 8/2013 | Lerner | G06F 9/546 709/223 |
| 8,639,625 B1* | 1/2014 | Ginter | G06F 21/51 705/51 |
| 10,417,298 B2* | 9/2019 | Scannell, Jr. | G06F 16/9577 |
| 2001/0043696 A1* | 11/2001 | Pinard | 379/265.01 |
| 2001/0049620 A1* | 12/2001 | Blasko | G06Q 10/10 705/14.53 |
| 2002/0066033 A1* | 5/2002 | Dobbins | H04L 67/02 726/4 |
| 2002/0132575 A1* | 9/2002 | Kesling | H04L 67/12 455/2.01 |
| 2003/0009423 A1* | 1/2003 | Wang et al. | 705/51 |
| 2003/0014387 A1* | 1/2003 | Kreidler | G06Q 30/0283 |
| 2003/0110132 A1* | 6/2003 | Sako | 705/51 |
| 2003/0154406 A1* | 8/2003 | Honarvar et al. | 713/201 |
| 2003/0158872 A1* | 8/2003 | Adams | 707/203 |
| 2003/0165241 A1* | 9/2003 | Fransdonk | 380/258 |
| 2003/0221167 A1* | 11/2003 | Goldstein et al. | 715/513 |
| 2003/0224759 A1* | 12/2003 | Burnett | H04N 21/44222 455/412.1 |
| 2004/0078341 A1* | 4/2004 | Steichen | G06Q 20/382 705/64 |
| 2004/0168077 A1* | 8/2004 | Waxman et al. | 713/200 |
| 2005/0038707 A1* | 2/2005 | Roever | G06Q 20/12 705/21 |
| 2005/0049886 A1* | 3/2005 | Grannan | G06Q 30/06 705/902 |
| 2005/0065891 A1* | 3/2005 | Lee | G06F 21/10 705/59 |
| 2005/0066353 A1* | 3/2005 | Fransdonk | 725/29 |
| 2005/0091173 A1* | 4/2005 | Alve | 705/71 |
| 2005/0228899 A1* | 10/2005 | Wendkos et al. | 709/232 |
| 2005/0283791 A1* | 12/2005 | McCarthy et al. | 725/1 |
| 2006/0063518 A1* | 3/2006 | Paddon | G06F 8/20 455/418 |
| 2006/0069926 A1* | 3/2006 | Ginter | G06F 21/10 375/E7.009 |
| 2006/0077941 A1* | 4/2006 | Alagappan | H04L 51/063 370/338 |
| 2006/0089912 A1* | 4/2006 | Spagna | H04L 63/0428 705/51 |
| 2006/0122936 A1* | 6/2006 | Balfanz | 705/51 |
| 2006/0168451 A1* | 7/2006 | Ishibashi | G06Q 30/06 713/176 |
| 2006/0178918 A1* | 8/2006 | Mikurak | G06Q 10/06375 705/7.25 |
| 2006/0242072 A1* | 10/2006 | Peled et al. | 705/51 |
| 2007/0061594 A1* | 3/2007 | Ginter | H04L 9/3263 713/165 |
| 2007/0083425 A1* | 4/2007 | Cousineau et al. | 705/14 |
| 2008/0027909 A1* | 1/2008 | Gang et al. | 707/3 |
| 2008/0215623 A1* | 9/2008 | Ramer et al. | 707/104.1 |
| 2008/0215718 A1* | 9/2008 | Stolorz et al. | 709/223 |
| 2011/0047080 A1* | 2/2011 | Im et al. | 705/59 |

OTHER PUBLICATIONS

Iwao, Tadashige, et al; Ubiquitous Computing with Service Adaptation Using Peer-to-Peer Communication Framework; Proceedings of the Ninth IEEE Workshop on Future Trends of Distributed Computing Systems; 2003.

Pendharkar, Parag C. and Young, Karl; The Development of a Construct for Measuring an Individual's Perception of Email as a Medium for Electronic Communication in Organizations; IEEE Transactions on Professional Communication, vol. 47, No. 2, Jun. 2004.

"TRUSTe Privacy Program Standards," TrustArc, Printed: Jun. 1, 2020, 10 pages. https://trustarc.com/consumer-info/pnvacy-certification-standards/.

"Network Abuse Clearing House," Abuse.net Home Pate, Printed: Jun. 1, 2020, 1 page. https://www.abuse.net/.

* cited by examiner

SITE POLICY ADMINISTRATIVE AGENT

BACKGROUND OF THE INVENTION

1. Statement of the Technical Field

The present invention relates to the field of inter-parties network computing and more particularly to site policy management for interactions between parties in a network computing environment.

2. Description of the Related Art

Inter-parties network computing relates to the interactions between different computing entities in a network computing environment. Generally, individuals can access content posted for distribution about the network computing environment. Content providers, in turn, can upload content for distribution to the individuals. Furthermore, content providers can generate and transmit content to individuals irrespective of whether or not the individuals had requested the transmitted content. In many instances, the unsolicited transmission of content to an individual can result from prior interactions between the individual and a content provider.

In this regard, in its infancy, inter-parties network computing involved little if any limitations upon the use of information disseminated about the global Internet. In particular, initially information provided by an individual in the course of interacting with a Web site could be used at will by the operator of the Web site. As privacy concerns have become paramount over time, however, Web site operators and other content providers have developed policies defining the permissible use of provided information. Web site operators further have published their respective policies such that individuals visiting the Web site can review prior to providing information when interacting with the Web site.

Policies generally include an indication of the nature of information which can be collected by the content provider, the parties with whom the provider can collect information, whether or not the provider can transmit additional content to agreeing parties, even if unsolicited, and the type of content which can be provided to agreeing parties, even if unsolicited. Typically characterized as "terms of use", much of the terms of use of network distributable content can be driven by contemporary legal requirements and industry standards. Yet, in that the legal and industrial environment is ever-changing, so too must the terms of use change often.

Managing the changing terms of use of a Web site can be challenging for content providers; however, the task can be even more daunting for individuals who frequent many Web sites at any one time. For these individuals, tracking the individual terms of use for each visited site can be nearly impossible absent sophisticated record keeping. In fact, merely understanding the terms of use of a Web site can be challenging enough for the typical end user. Moreover, the implication of any one of the terms of use for a Web site can be unclear even for the skilled legal expert.

SUMMARY OF THE INVENTION

The present invention addresses the deficiencies of the art in respect to policy management for inter-parties network computing and provides a novel and non-obvious method, system and apparatus for a site policy administrative agent configured to perform policy management for inter-parties network computing. In accordance with the present invention, an inter-parties network can include one or more content providers communicatively coupled to one or more content recipients. The network further can include a site policy administrative agent disposed in a communications path between the content providers and content recipients. Importantly, the site policy administrative agent can include programming logic to administer site policies on behalf of the content providers and to enforce the site policies on behalf of the content recipients.

In a preferred aspect of the invention, an interface to the site policy administrative agent can be provided, the interface providing access to modify the site policy. A mapping of recipient preferences selected by the recipients to terms of the site policies further can be provided. In this regard, the recipient preferences can include specified content deemed one of permissible and impermissible to be received. The recipient preferences also can include a specified classification of content deemed one of permissible and impermissible to be received. The recipient preferences yet further can include specified providers from whom content is deemed one of permissible and impermissible to be received. Finally, the recipient preferences can include a specified classification of content providers from whom content is deemed one of permissible and impermissible to be received.

A policy management method for inter-parties network computing can include establishing a set of policy terms for receiving content from a content provider based upon preferences selected by a content recipient externally to the content recipient and content provider. The method further can include enforcing the policy terms externally to the content recipient and content provider for content provided by the content provider for receipt by the content recipient. Notably, the establishing step can include mapping the selected preferences to the set of policy terms. The establishing step also can include exposing an interface to the content recipient, and accepting the selected preferences through the interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for a site policy administrative agent configured to perform policy management for inter-parties network computing. In accordance with the present invention, a site policy administrative agent can be configured to administer the site policies for one or more registered content providers in respect to one or more registered content recipients. The site policy administrative agent can provide an interface to the recipients to define policy preferences for interacting with the content providers. The interface further can permit the recipients to change established policy preferences. In both cases, the recipients can specify particular preferences regarding content providers or specific content. Alternatively, the recipients can specify general preferences regarding content provider classifications or content classifications.

The site policy administrative agent can process content provided by the content providers on behalf of the recipients. Based upon the nature of the content and the identity or characteristics of the provider, the terms of the policies for the recipients can be applied to produce a recipient list for the content. Specifically, the policy terms matching the policy preferences defined for the recipients can be compared to the content provided by the content provider and the identity of the provider or the characteristics of the provider. Where the policy terms permit the transmission of the content to one or more recipients in the recipient list, those recipients can be permitted to receive the content. The other recipients can be excluded from the transmission of the content.

Figure 1:
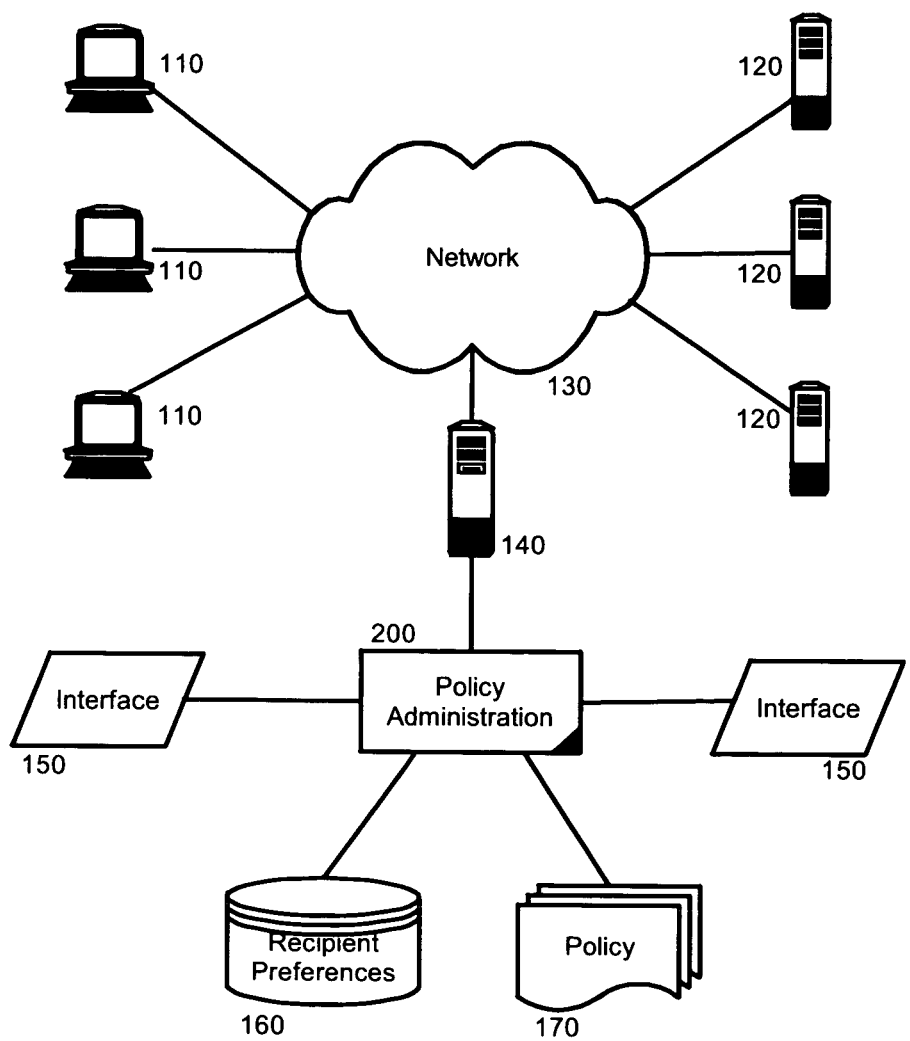
FIG. 1 is a schematic illustration of an inter-parties computing network configured with a site policy management agent in accordance with the present invention; and, FIG. 2 is a flow chart illustrating a process for site policy management in the system of FIG. 1.

In further illustration of a particular aspect of the present invention, FIG. 1 is a schematic illustration of an inter-parties computing network configured with a site policy management agent. The inter-parties computing network can include one or more content providers 120 communicatively coupled to one or more content recipients 110 over a data communications network 130, for example the global Internet. Importantly, a policy administration agent 140 can be disposed in between the content recipients 110 and the content providers 120. Specifically, the policy administration agent 140 can be arranged to process content provided by the content providers 120 for consumption by the content recipients 110.

The policy administration agent 140 can include a data store of recipient preferences 160 and a set of policies 170, both managed by the policy administration process 200. To that end, the policy administration process 200 can include an exposed interface 150 permitting both the content recipients 110 and the content providers 120 to register with the policy administration and to access the policies 170. Moreover, the interface 150 can permit the content recipients 110 to establish and modify preferences stored in the data store of recipient preferences 160.

More particularly, the content recipients 110 can specify one or more general rules regarding specific content, or a content classification. The content recipients 110 further can specify one or more general rules regarding specific ones of the content providers 120, or a classification of content providers 120. In either case, the general rules can be recorded in the data store of recipient preferences 160 and the general rules can be mapped to one or more policy terms in the one or more of the policies 170. In operation, content provided by the providers 120 and directed to the recipients 110 can be screened by the policy administration process 200 to determine if the policies 170 permit the receipt of the content by the recipients 110. Only that content permitted by the policies 170 to be received by the recipients 110 can be allowed to pass to the recipients 110.

Figure 2:
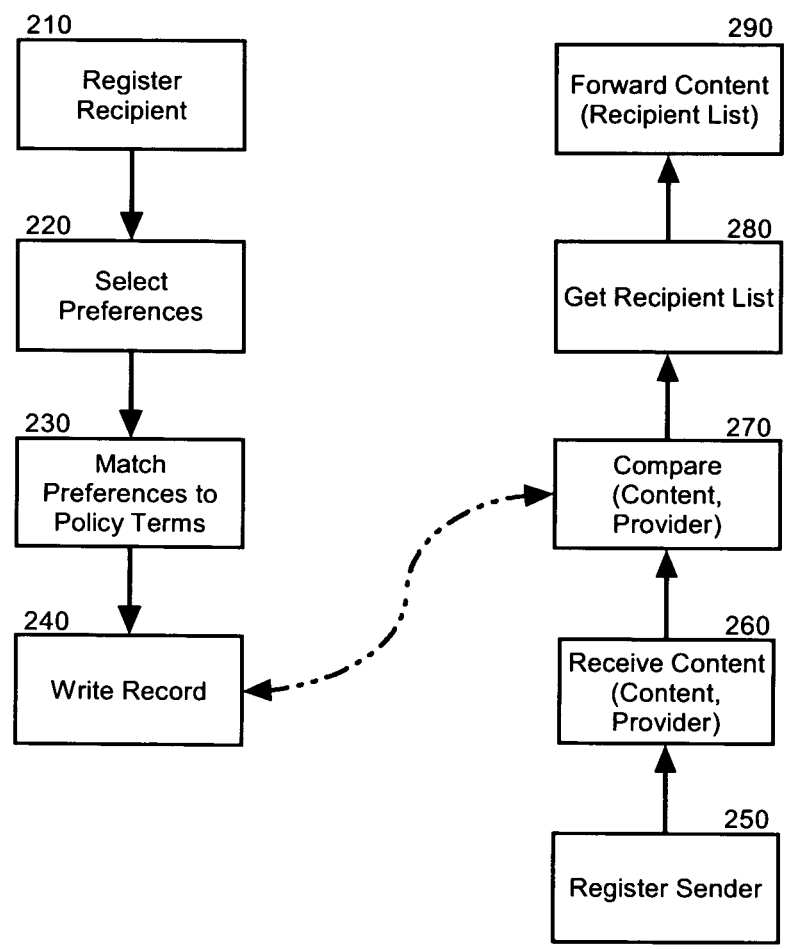

In further illustration, FIG. 2 is a flow chart illustrating a process for site policy management in the system of FIG. 1. Beginning in block 210, a recipient can be registered in the site policy agent. In block 220, preferences for the recipient can be selected, which preferences can include the permission or exclusion of specific content, or the permission or exclusion of a content class. The preferences further can include the permission or exclusion of content from a specific provider, or the permission or exclusion of a class of provider or a provider having a certain characteristic. In any event, in block 230 the preferences can be mapped to policy terms to form an acceptable site policy for the recipient. Finally, in block 240 the acceptable site policy can be written to persistent storage.

In block 250, a content provider can be registered in the site policy agent. Once registered, in block 260 the content provider can provide content to be delivered to one or more of the recipients. In block 270, both the content itself and the content provider can be compared to the acceptable site policies written to persistent storage. In block 280, based upon the comparison, a list of recipients having policies which permit the acceptance of the content can be compiled. Finally, in block 290 the content can be permitted to be received by the recipients in the list.

Several advantages will be realized through the operation of the agent of the present invention. First, because the mediation of the policy application is handled by the agent, the agent acts as a clearinghouse for the set of policies such that there is one consistent set of policies regarding the transmission of content from provider to recipient. Second, the agent can interact with the content providers relieving the content recipients of this burden. Third, the interface expressing the policies can enjoy lifecycle improvements because the agent remains dedicated to the problem of managing the policies and therefore has an incentive to improve the interface rather than merely treating the interface as a necessary side-effect of a relationship.

Fourth, content providers no longer must create the policy terms and the infrastructure able to support the policy terms. Instead, the content providers can interact with the agent to provide information to express the goals for transmitting content to recipients. The agent in turn can translate those goals to concrete policy terms. Fifth, a much greater degree of security for recipients and providers can be possible because the policies can be managed through one dedicated system rather than many diverse systems. Recipients do not need to know the names of the providers, and the providers need not to know names of recipients.

Sixth, a much more flexible policy system can be constructed in that, rather than the recipient making a decision about content based upon the type of provider and by guessing about the nature of the provider's affiliates, the recipient can make choices based upon categorical policies. For instance, a recipient can choose to receive content regarding products, but not services. In another example, a recipient can permit content regarding a class of products, but the recipient can decline content regarding other classes of the same product. As yet another example, a recipient can include or exclude content originating from a particular type of provider defined by any characteristic of the provider including the location of the provider.

Seventh, recipients could return to the agent interface to modify preferences at any time. Additionally, a consistent feedback mechanism can be provided permit recipients to tune their preferences by responding to received content rather than by returning to the agent interface. In this regard, recipients can specify when to decline or accept future content similar to contemporaneously received content. Finally, recipients can refer received content to the agent when the recipient believes that the content violates previously established preferences. The agent in turn can mediate with the offending provider on behalf of the recipient. Consequently, providers can be provided an incentive to behave well, and recipients can be provided an incentive to accept more content because the recipients enjoy clearer and better control over the content which the recipients receive.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computerized policy management method for inter-parties network computing between different computing entities in a network computing environment including a multiplicity of content providers, a multiplicity of content recipients, and a site policy administrative agent comprising a computer having a memory storing instructions, a processor, and disposed in the network computing environment between the content providers and the content recipients, that when the processor executes the instructions, cause the processor to perform the method steps comprising:

receiving, by the site policy administrative agent, a set of policy terms from a content provider of the content providers via an interface provided by the site policy administrative agent, wherein the policy terms cause the processor of the site policy agent to enforce the policy terms externally to the content recipients and the content providers;

storing, by the policy administrative agent, the policy terms in the memory;

loading, by the site policy administrative agent, the policy terms into the memory of the computer, the policy terms specifying content is permitted to be delivered a content recipient from the content recipients;

registering, by the site policy administrative agent, both the content recipients and the content providers in the site policy administrative agent;

receiving, by the site policy administrative agent, one or more general rules from the content recipient registered with the site policy administrative agent and via the interface provided by the site policy administrative agent, each of the general rules indicating a preference by the content recipient as to either at least one content provider from the content providers for which content is to be permitted or another content provider from the content providers for which content is to be excluded from delivery to the content recipient, and recording in a data store;

mapping, by the site policy administrative agent, each of the general rules recorded in the data store to a corresponding one of the policy terms in the loaded by comparing each of the general rules with the policy terms and selecting the policy terms that match with general rules to form a site policy for the content recipient that permit the acceptance of the content to the content recipient and storing each formed site policy in a data store;

receiving content designated for delivery to the content recipient from the content provider over the network computing environment to the site policy administrative agent;

in response to the receipt of the content, determining an identity of the content provider providing the received content, matching the identity to the content recipient within the acceptable site policy, and forwarding said received content designated for delivery over the network computing environment to the content recipient permitted by the site administrative policy agent according to the matching and excluding the received content from delivery to the content recipients with an unacceptable site policy; and mediating on behalf of the content recipient with the content provider that incentives the content provider and the content recipient to accept additional content form the content provider.

2. The method of claim 1, further comprising providing a user interface from said site policy administrative agent through which the site policy is formed.

3. The method of claim 1, wherein the general rules additionally indicate specific content not permitted to be delivered to content recipient.

4. The method of claim 1, wherein the general rules additionally indicate a class of content not permitted to be delivered to the content recipient.

5. The method of claim 2, further comprising responding to the receipt of the content by additionally tuning said formed site policy to require an exclusion of a future receipt of content that is similar to the received content.

* * * * *